United States Patent [19]
Sekihata et al.

[11] Patent Number: 5,343,462
[45] Date of Patent: Aug. 30, 1994

[54] FAULT NOTIFYING SYSTEM FOR ASYNCHRONOUS TRANSFER MODE COMMUNICATION SYSTEM

[75] Inventors: Osamu Sekihata; Susumu Eda; Katsumi Oomuro; Ryuji Hyodo; Kenji Tanaka; Hiroyuki Hatta; Reiko Furuya, all of Kawasaki, Japan

[73] Assignee: Fujitsu Limited, Kawasaki, Japan

[21] Appl. No.: 853,625

[22] Filed: Mar. 19, 1992

[30] Foreign Application Priority Data

Mar. 20, 1991 [JP] Japan .................. 3-57274

[51] Int. Cl.⁵ .................. H04J 1/16; H04J 3/14
[52] U.S. Cl. .................. 370/13; 370/60.1
[58] Field of Search .............. 370/94.1, 60, 60.1, 370/13, 16, 94.2, 58.1, 58.2, 58.3, 14

[56] References Cited

U.S. PATENT DOCUMENTS

| | | | |
|---|---|---|---|
| 5,058,104 | 10/1991 | Yonehara et al. | 370/13 |
| 5,101,404 | 3/1992 | Kunimoto et al. | 370/60 |
| 5,130,984 | 7/1992 | Cisneros | 370/60 |
| 5,132,964 | 7/1992 | Esaki | 370/60 |

FOREIGN PATENT DOCUMENTS 3-16340 1/1991 Japan .

Primary Examiner—Benedict V. Safourek
Assistant Examiner—Ajit Patel
Attorney, Agent, or Firm—Staas & Halsey

[57] ABSTRACT

A fault notifying system notifies a fault in an asynchronous transfer mode (ATM) network to at least one data terminating equipment (DTE). The fault notifying system includes a network interface coupled to the ATM network for outputting an alarm indication signal (AIS) when a fault is generated in the ATM network. An ATM crossconnect part generates an AIS cell having a predetermined signal format in response to the AIS. An adaptation layer processing part forms ATM cells, disassembles ATM cells and outputs a data circuit-terminating equipment not ready (DNR) in response to the AIS cell. A terminal interface coupled to the DTE notifies the fault in the ATM network to the DTE in response to the DNR. The AIS cell has a cell format identical to an ATM cell format but has predetermined information in a specific part of the ATM cell format to distinguish the AIS cell from the ATM cell.

13 Claims, 12 Drawing Sheets

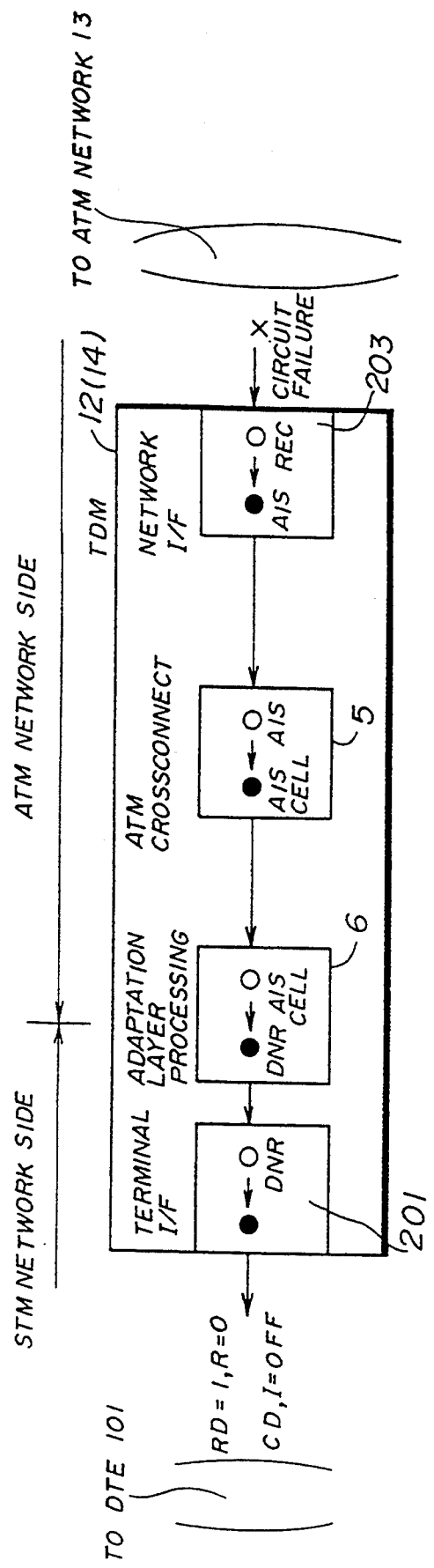

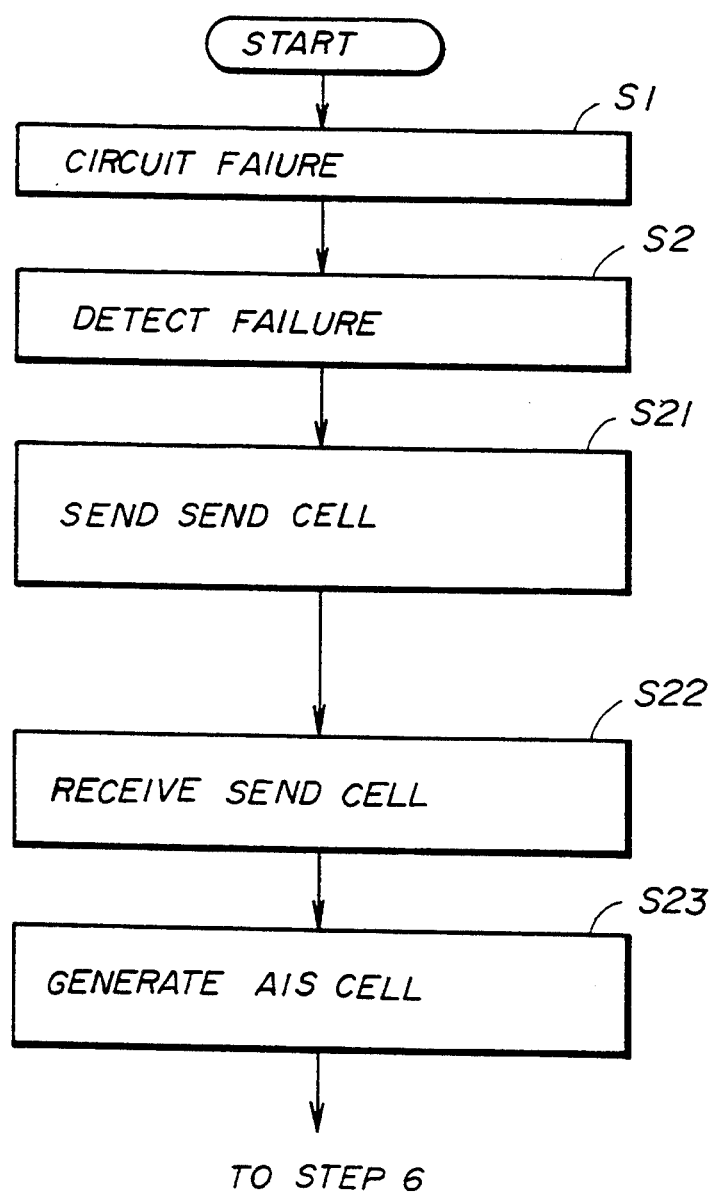

FAULT NOTIFYING SYSTEM FOR ASYNCHRONOUS TRANSFER MODE COMMUNICATION SYSTEM

BACKGROUND OF THE INVENTION

The present invention generally relates to fault notifying systems, and more particularly to a fault notifying system for notifying a fault in an asynchronous transfer mode (ATM) communication system.

FIG. 1 shows an example of a conventional synchronous transfer mode (STM) communication system. For example, data terminal equipments (DTEs) $101_1$ through $101_3$ are coupled to a time division multiplexer (TDM) 102, and DTEs $105_1$ through $105_3$ are coupled to a TDM 104. The TDMs 102 and 104 are coupled via a STM network 103.

FIG. 2 shows an example of the general construction of the TDM 102 (or 104). The TDM 102 (or 104) includes a terminal interface 201 which is coupled to the DTE 201 (or 105), a multiplex controller 202, and a network interface 203 which is coupled to the STM network 103. In FIG. 2, a white circle indicates a reception and a black circle indicates a transmission.

If a circuit failure is generated, this failure is detected at the network interface 203 by detecting a received error code (REC) from the loss of circuit (line) synchronization, and an alarm indication signal (AIS) is supplied to the multiplex controller 202. This AIS has a signal format in which the bits are all "1" so as to cause synchronization error. The multiplex controller 202 supplies a data circuit-terminating equipment (DCE) not ready (DNR) code to the terminal interface 201 in response to the AIS. For example, the DNR code has a signal format in which a frame bit F is provided at the head and the bits are all "0". The terminal interface 201 notifies the DTE 101 of the detected failure by making RD=1, R=0, and CD, I=OFF. The signals RD and CD are prescribed under the CCITT Recommendation X-Series, and the signals R and I are prescribed under the CCITT Recommendation V-Series.

The detected failure is notified in the above described manner in the case of the STM network. However, in the case of the ATM network, the conventional means used to notify the detected failure cannot be employed, particularly because predetermined ATM cells are used for the communication via the ATM network. Hence, there is a demand to realize a system for efficiently and positively notifying the detected failure in the ATM network.

On the other hand, in the conventional STM communication system, the TDM fixedly assigns a band to each DTE, and the band assignment is inefficient if the DTE is unused, for example. Accordingly, it is desirable to improve the multiplexing efficiency of the TDM if applied to the ATM communication system.

SUMMARY OF THE INVENTION

Accordingly, it is a general object of the present invention to provide a novel and useful fault notifying system in which the problems described above are eliminated and the demands are satisfied.

Another and more specific object of the present invention is to provide a fault notifying system for notifying a fault in an asynchronous transfer mode (ATM) network to at least one data terminating equipment (DTE), comprising a network interface, coupled to the ATM network, for outputting an alarm indication signal (AIS) when a fault is generated in the ATM network, an ATM crossconnect part, coupled to the network interface, for generating an AIS cell having a predetermined signal format in response to the AIS, an adaptation layer processing part, coupled to the ATM crossconnect part, including means for forming ATM cells and disassembling ATM cells and for outputting a data circuit-terminating equipment not ready (DNR) in response to the AIS cell, and a terminal interface, coupled to the DTE, for notifying the fault in the ATM network to the DTE in response to the DNR, where the AIS cell has a cell format identical to an ATM cell format but has predetermined information in a specific part of the ATM cell format to distinguish the AIS cell from the ATM cell. According to the fault notifying system of the present invention, it is possible to notify the fault correctly in an ATM communication system.

Other objects and further features of the present invention will be apparent from the following detailed description when read in conjunction with the accompanying drawings.

BRIEF DESCRIPTION OF THE DRAWINGS

FIG. 4 is a system block diagram showing the embodiment of the fault notifying system according to the present invention;

FIG. 15 is a flow chart for explaining the notification of the circuit failure by generating the SEND cell.

DESCRIPTION OF THE PREFERRED EMBODIMENTS

Figure 1:
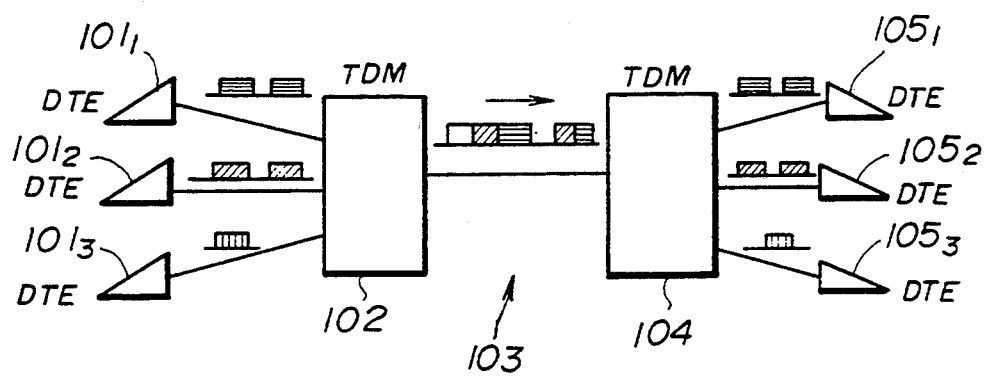
FIG. 1 is a system block diagram showing an example of a conventional STM communication system.
Figure 3:
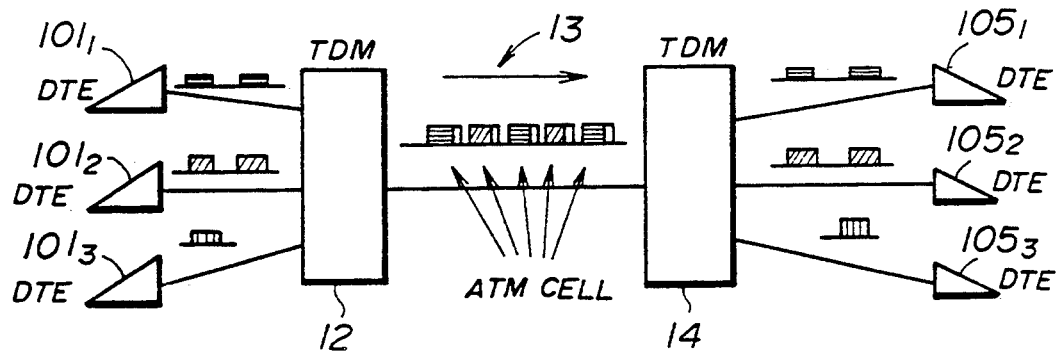
FIG. 3 is a system block diagram showing an ATM communication system to which an embodiment of a fault notifying system according to the present invention is applied.

FIG. 3 shows an ATM communication system to which an embodiment of a fault notifying system according to the present invention may be applied. In FIG. 3, those parts which are basically the same as those corresponding parts in FIG. 1 are designated by the same reference numerals, and a description thereof will be omitted.

In FIG. 3, a TDM 12 and a TDM 14 are coupled via an ATM network 13. Hence, an ATM communication using ATM cells is made between the TDMs 12 and 14 via the ATM network 13. On the other hand, an STM communication is made between each DTE 101 and the TDM 12, and between each DTE 105 and the TDM 14.

Figure 2:
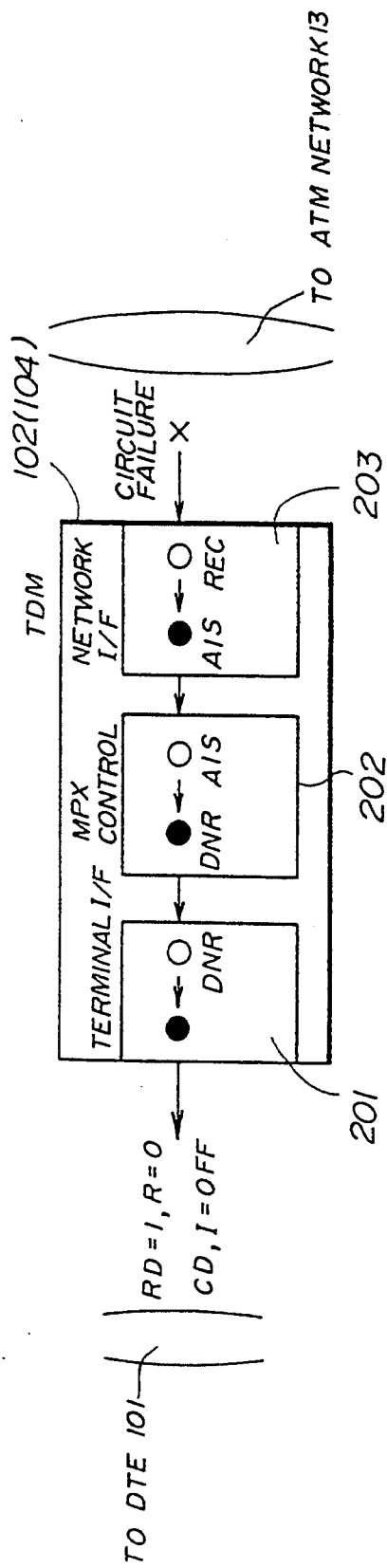
FIG. 2 is a system block diagram showing the construction of a TDM shown in FIG. 1.

FIG. 4 shows an embodiment of the TDM 12 (or 14). In FIG. 4, those parts which are basically the same as those corresponding parts in FIG. 2 are designated by the same reference numerals, and a description thereof will be omitted.

In FIG. 4, a TDM 12 (or 14) includes a network interface 203, an ATM crossconnect part 5, an adaptation layer processing part 6 and a terminal interface 201. A white circle indicates a reception and a black circle indicates a transmission. The network interface 203 is connected to the ATM network 13. The ATM crossconnect part 5 switches the lines, and the adaptation layer processing part 6 carries out the processes of forming ATM cells and disassembling the ATM cells. The terminal interface 201 is connected to the DTE 101.

A circuit failure is detected by the network interface 2 by detecting the received error code (REC) from the loss of circuit (line) synchronization, and an alarm indication signal (AIS) is supplied to the ATM crossconnect part 5. This AIS has a signal format in which the bits are all "1" so as to cause synchronization error. In the ATM crossconnect part 5, the synchronization of a header error control (HEC) is lost by the receipt of the AIS. When the HEC synchronization is lost, the ATM crossconnect part 5 supplies to the adaptation processing layer 6 a special ATM cell (AIS) cell which will be described later.

The adaptation layer processing part 6 supplies a DNR code to the terminal interface 201 in response to the AIS cell. For example, the DNR code has a signal format in which a frame bit F is provided at the head and the bits are all "0". The terminal interface 201 notifies the DTE 101 of the detected failure by making RD=1, R=0, and CD, I=OFF.

Of course, when the ATM crossconnect part 5 is notified of the detected circuit failure, the AIS is broadcast to each channel having the virtual paths (VPs) using the line. For this reason, the AIS cell is made up of the virtual path identifier (VPI) and the AID information. The adaptation layer processing part 6 which receives the AIS cells thus looks at the VPI and transmits the DNR code or the AIS code to the corresponding channels.

In FIG. 4, the network interface 203, the ATM crossconnect part 5 and a part of the adaptation layer processing part 6 may be regarded as being on the side of the ATM network. On the other hand, the remaining part of the adaptation layer processing part 6 and the network interface 201 may be regarded as being on the side of the STM network.

Figure 5:
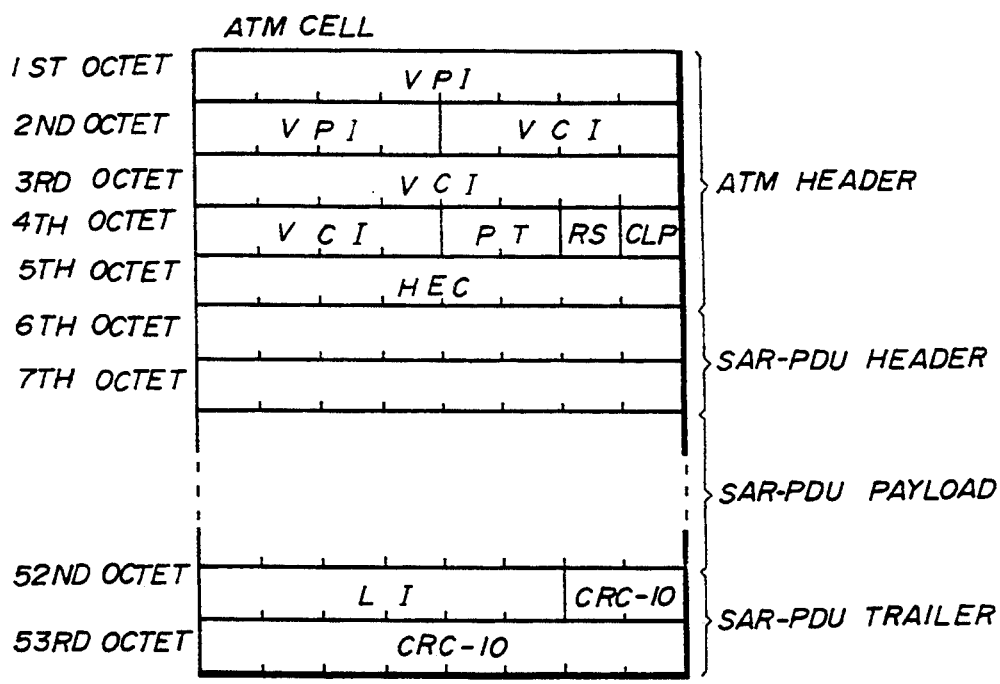
FIG. 5 shows a signal format of an ATM cell.

FIG. 5 shows the signal format of the ATM cell. The ATM cell is made up of 53 octets, and an ATM header is formed by the first 6 octets. The ATM header includes a virtual path identifier (VPI), a virtual channel identifier (VCI), a payload type (PT), a reserve field (R3), a cell loss priority (CLP) and a header error control (HEC). The VCI and VPI respectively specify the virtual channel and the virtual path, and the PT is used to identify whether the ATM cell is used for user information or for network operation. The CLP indicates the priority of the ATM cell which should not be lost. The HEC is used for header error control and cell synchronization. The RS indicates information related to reserve.

A segmentation and reassembly sublayer -protocol data unit (SAR-PDU) header is formed by the sixth and seventh octets of the ATM cell. A SAR-PDU payload is formed by the eighth through the fifty-first octets of the ATM cell. A SAR-PDU trailer is formed by the last two octets of the ATM cell. The SAR-PDU trailer includes a length indicator (LI) and a cyclic redundancy code (CRC).

Figure 6:
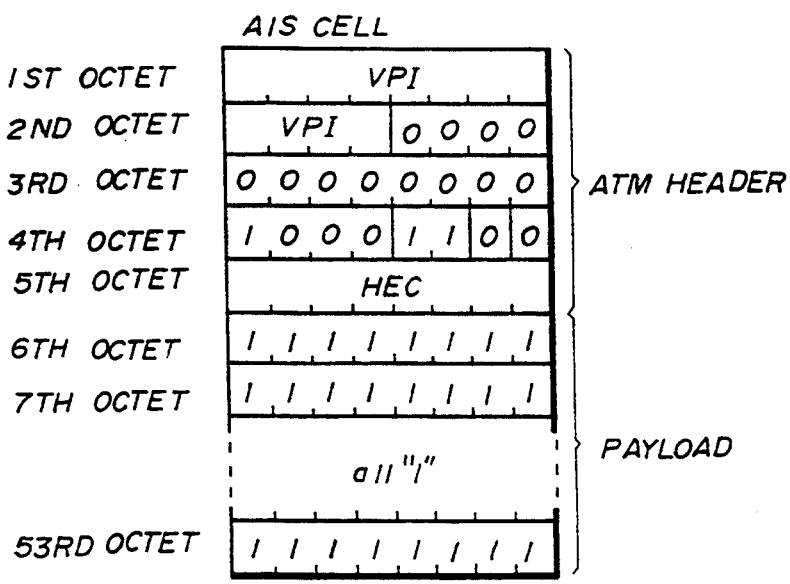
FIG. 6 shows a signal format of an AIS cell.

FIG. 6 shows the signal format of the AIS cell which is used in this embodiment. This AIS cell may be regarded as a special kind of ATM cell. An appropriate value is given to the VPI, and "0008" in hexadecimal is fixedly given to the VCI. A value "11" is given to the PT to indicate the use of the cell for the network operation. The remaining parts of the AIS cell are all "1" except for the HEC.

Figure 7:
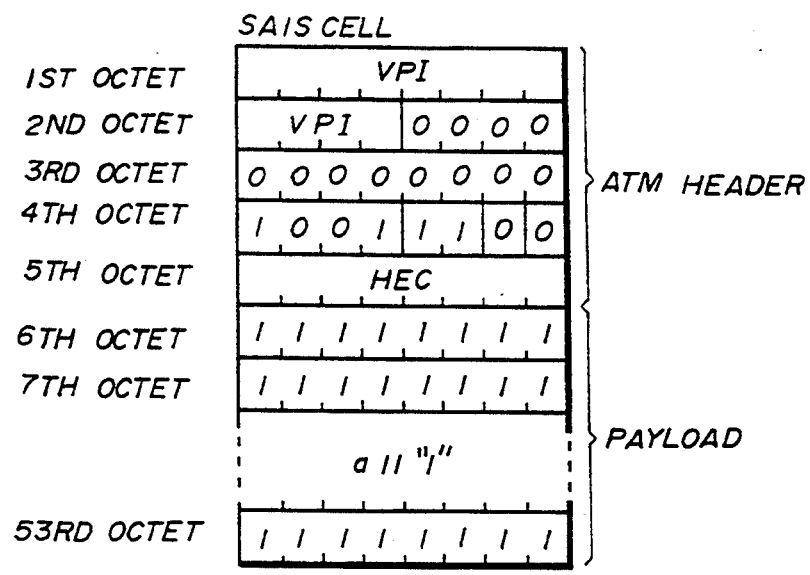
FIG. 7 shows a signal format of a SAIS cell.

FIG. 7 shows the signal format of a stop AIS (SAIS) cell. Compared to the AIS cell shown in FIG. 6, this SAIS cell differs in that a value "0009" in hexadecimal is given to VCI.

Figure 8:
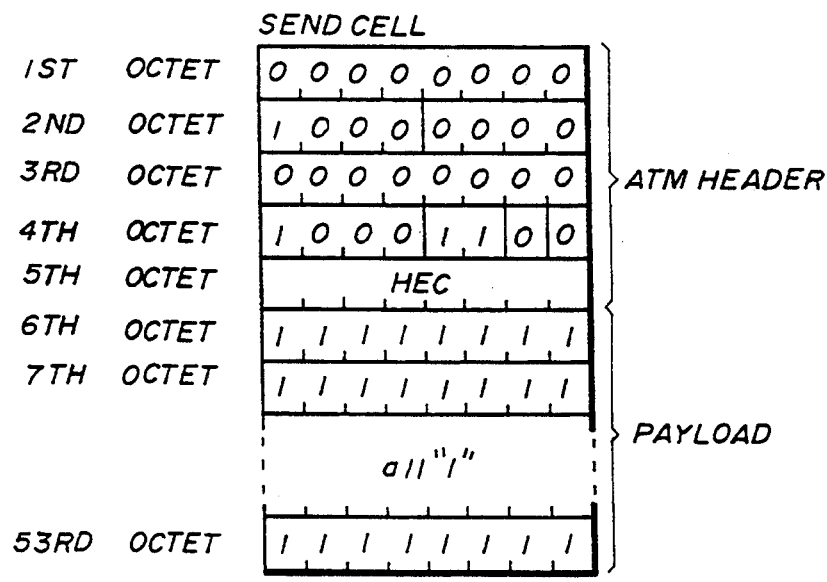
FIG. 8 shows a signal format of a SEND cell.

FIG. 8 shows the signal format of a SEND cell. Compared to the AIS cell shown in FIG. 6, this SEND cell differs in that a value "008" in hexadecimal is given to the VPI. This SEND cell is used when a one-way circuit failure occurs, as will be described later. Of course, a predetermined value may be given to the VPI and the VCI of the SEND cell.

Figure 9:
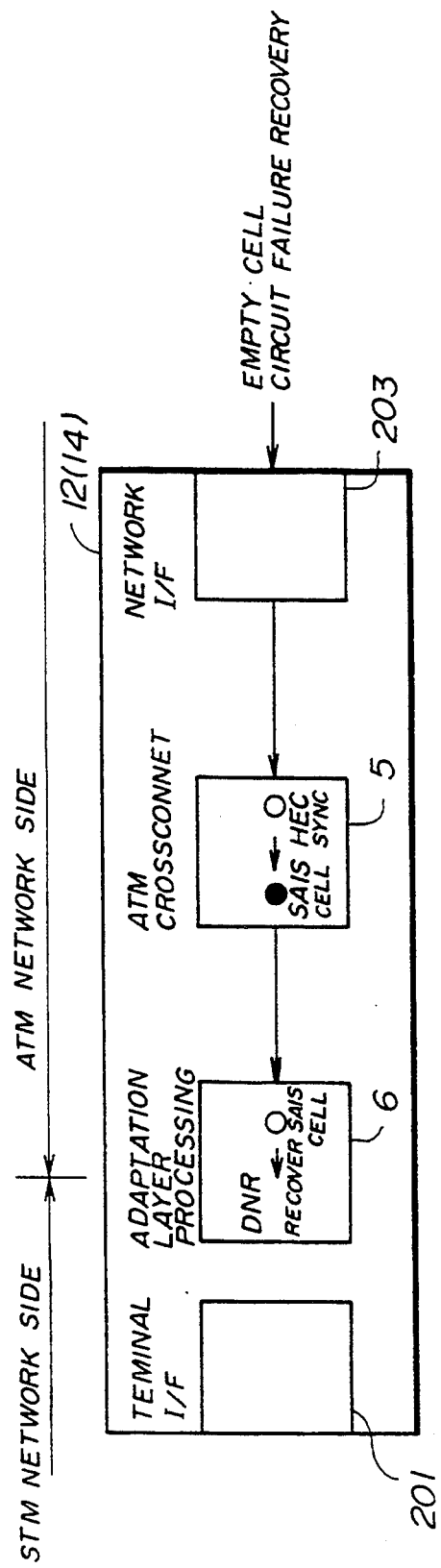
FIG. 9 is a diagram for explaining a recovery of a circuit failure in the embodiment.

FIG. 9 is a diagram for explaining the operation of this embodiment when recovering a circuit failure. In FIG. 9, those parts which are the same as those corresponding parts in FIG. 4 are designated by the same reference numerals, and a description thereof will be omitted.

When the circuit failure is notified as described above in conjunction with FIG. 4 and the circuit failure is recovered, the network interface 203 receives the ATM cell from a station on the other end of the ATM network 13 (hereinafter simply referred to as the other station) and enters a HEC synchronization state. In other words, the ATM crossconnect part 5 constantly transmits empty (or dummy) cells to the other station, and the synchronization is achieved when the circuit failure is recovered.

When the HEC synchronism is achieved in the ATM crossconnect part 5, the ATM crossconnect part 5 transmits the SAIS cell shown in FIG. 7 to the adaptation layer processing part 6. The adaptation layer processing part 6 recovers the DNR in response to the SAIS cell.

Figure 10:
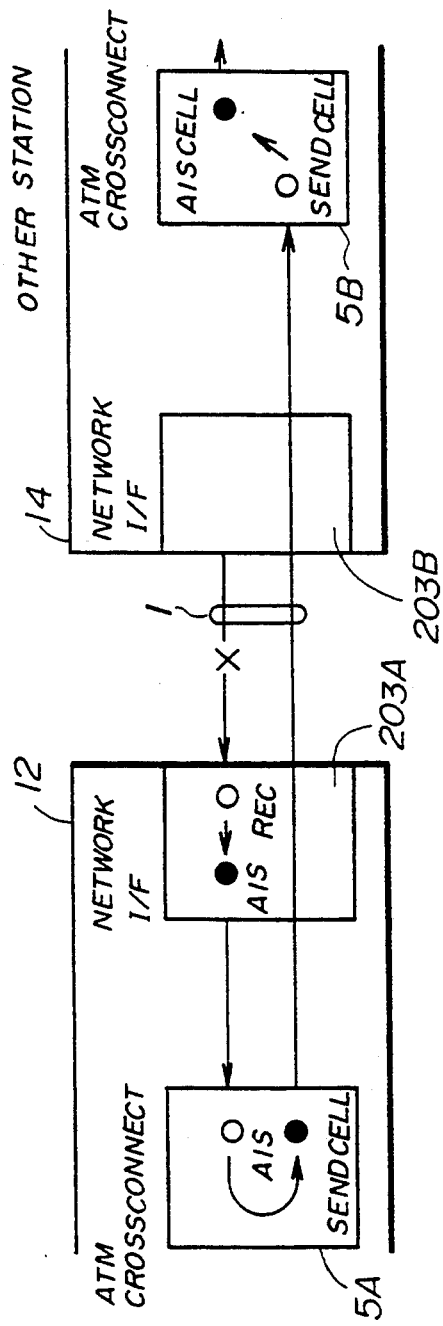
FIG. 10 is a diagram for explaining a one-way circuit failure.

FIG. 10 is a diagram for explaining the operation of this embodiment when a one-way circuit failure occurs. In FIG. 10, those parts which are the same as those corresponding parts in FIGS. 3 and 4 are designated by the same reference numerals, and a description thereof will be omitted. FIG. 10 shows a case where the circuit failure is generated in only the one-way line of a line 1 in the ATM network 13. Hence, the TDM 12 must notify the TDM 14 of this circuit failure.

As described above in conjunction with FIG. 4, the network interface 203A transmits the AIS to the ATM crossconnect part 5A when the network interface 203A detects the circuit failure. The HEC synchronization is lost in the ATM cross connect part 5A when the ATM crossconnect part 5A receives the AIS. When the HEC synchronization is lost, the ATM crossconnect part 5A transmits the SEND cell shown in FIG. 8 towards the TDM 14 on the side of the other station. The ATM crossconnect part 5B of the TDM 14 transmits the AIS cell shown in FIG. 6 to the adaptation layer processing part 6B (not shown in FIG. 10) in response to this SEND cell received from the ATM crossconnect part 5A of the TDM 12. The process carried out thereafter is the same as that described above in conjunction with FIG. 4. By transmitting the SEND cell, it becomes possible to prevent a communication state from being generated in only a one-way circuit (line).

Figure 11:
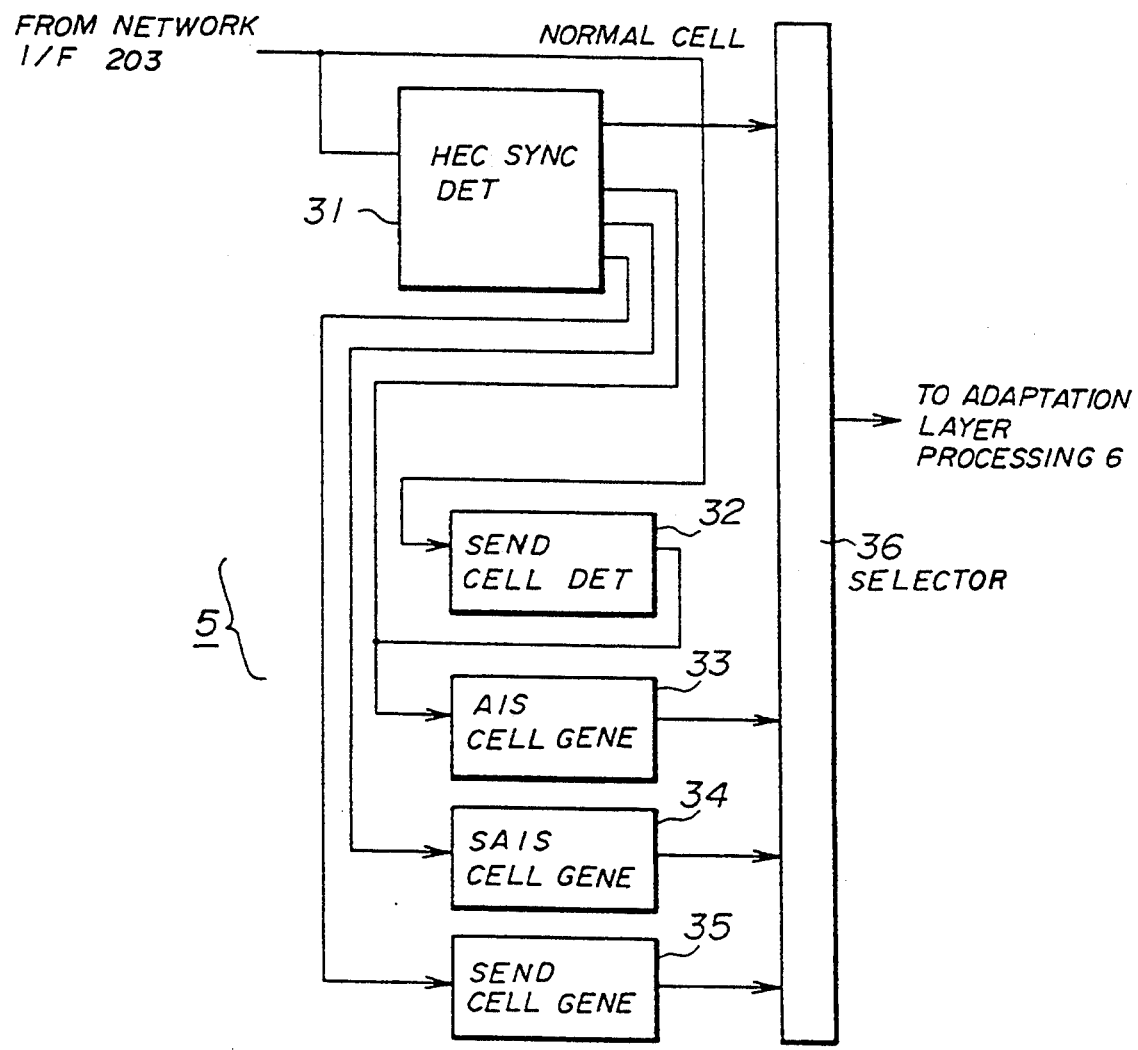
FIG. 11 is a system block diagram showing an embodiment of an essential part of an ATM crossconnect part.

FIG. 11 shows an embodiment of an essential part of the ATM crossconnect part 5. The ATM crossconnect part 5 includes a HEC synchronization detector 31, a SEND cell detector 32, an AIS cell generator 33, a SAIS cell generator 34, a SEND cell generator 35 and a selector 36 which are connected as shown.

The ATM crossconnect part 5 shown in FIG. 11 receives the data from the other station via the network interface 203, and the HEC synchronization detector 31 detects the HEC synchronization. The HEC synchronization detector 31 detects the synchronization error when the AIS is received, and sends enable signals to the AIS generator 33 and to the SEND cell generator 35. Hence, the AIS cell is generated by the AIS cell generator 33 in response to the enable signal, and the SEND cell is generated by the SEND cell generator 35 in response to the enable signal.

When the circuit failure is recovered and the AIS is recovered, the ATM cell (empty or dummy cell) is received from the other station and the HEC synchronization is achieved. Hence, the HEC synchronization detector 31 sends an enable signal to the SAIS cell generator 34 so as to generate the SAIS cell.

The selector 36 selects the normal cell when the HEC is synchronized, and selects the AIS cell or the SEND cell when the HEC is not synchronized. In addition the selector 36 selects the SAIS cell when recovering the HEC synchronization.

When the SEND cell detector 34 detects the SEND cell, this SEND cell detector 34 sends an enable signal to the AIS cell generator 33 so as to generate the AIS cell.

Figure 12:
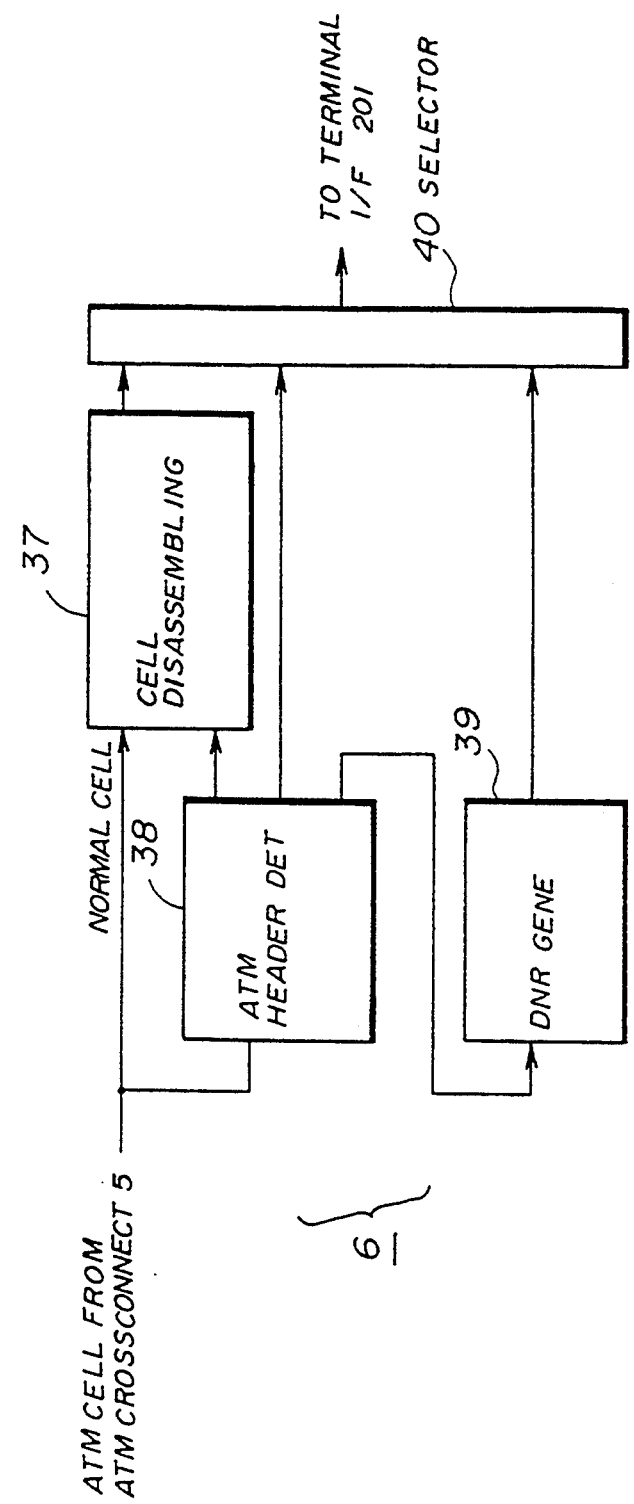
FIG. 12 is a system block diagram showing an embodiment of an essential part of an adaptation layer processing part.

FIG. 12 shows an embodiment of an essential part of the adaptation layer processing part 6. The adaptation layer processing part 6 shown in FIG. 12 includes a cell disassembling part 37, an ATM header detector 48, a DNR/AIS code generator 39 and a selector 40 which are connected as shown.

The ATM header of the ATM cell which is received from the ATM crossconnect part 5 is checked in the ATM header detector 48. If the ATM header includes the VPI or VCI corresponding to the channel, the ATM header detector 38 supplies an enable signal to the cell disassembling part 37 to disassemble the ATM cell. The cell disassembling part 37 disassembles the ATM cell in response to the enable signal from the ATM header detector 38.

On the other hand, when the ATM header detector 38 detects the AIS cell, the ATM header detector 38 supplies an enable signal to the DNR/AIS code generator 39. When enabled by the enable signal, the DNR/AIS code generator 39 generates one of two kinds of codes, that is, the DNR code or the AIS code, depending on the terminal speed. Furthermore, when the ATM header detector 38 detects the SAIS cell, the ATM header detector 38 stops supplying the enable signal to the DNR/AIS code generator 39.

The selector 40 selects the data to be transmitted to the terminal interface 201. When the VPI or VCI corresponding to the channel is received at the ATM header detector 38, the selector 40 selects the disassembled data obtained in the cell disassembling part 37. On the other hand, the selector 40 selects the data from the DNR/AIS code generator 39 when the AIS cell or the SAIS cell is received at the ATM header detector 38.

Next, a description will be given of the process of generating the AIS, SAIS and SEND cells in this embodiment, by referring to FIGS. 13 through 15.

Figure 13:
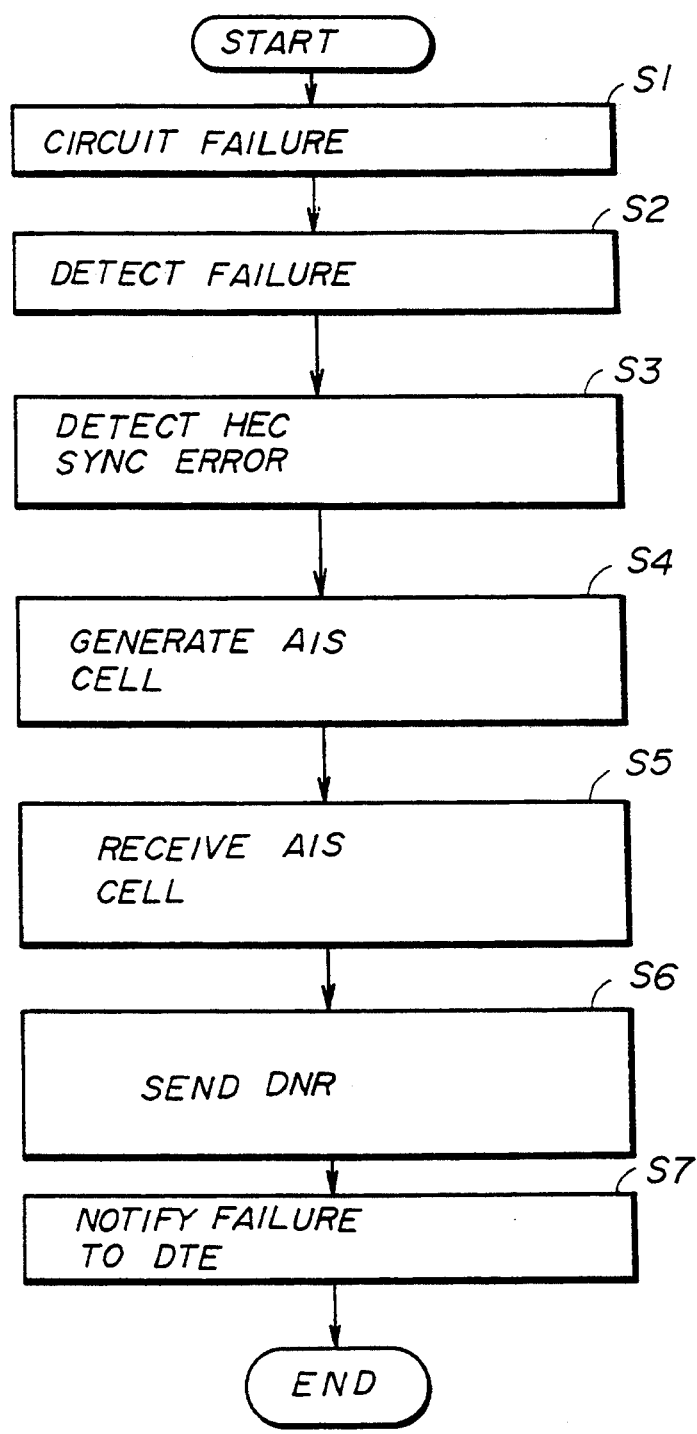
FIG. 13 is a flow chart for explaining the notification of a circuit failure by generating the AIS cell.

FIG. 13 shows the operation of this embodiment which notifies the circuit failure using the AIS cell. In FIG. 13, a circuit failure is generated in a step S1 and this circuit failure is detected by the network interface 203 in a step S2. Then, the ATM crossconnect part 5 detects the HEC synchronization error in a step S3 in response to the AIS from the network interface 203 and generates the AIS cell in a step S4. The adaptation layer processing part 6 receives the AIS cell in a step S5, and sends the DNR to the terminal interface 201 in a step S6. The terminal interface 201 notifies the DTE 101 of the detected circuit failure in a step S7.

The steps S3 through S5 form the characterizing part of the circuit failure notification in this embodiment.

Figure 14:
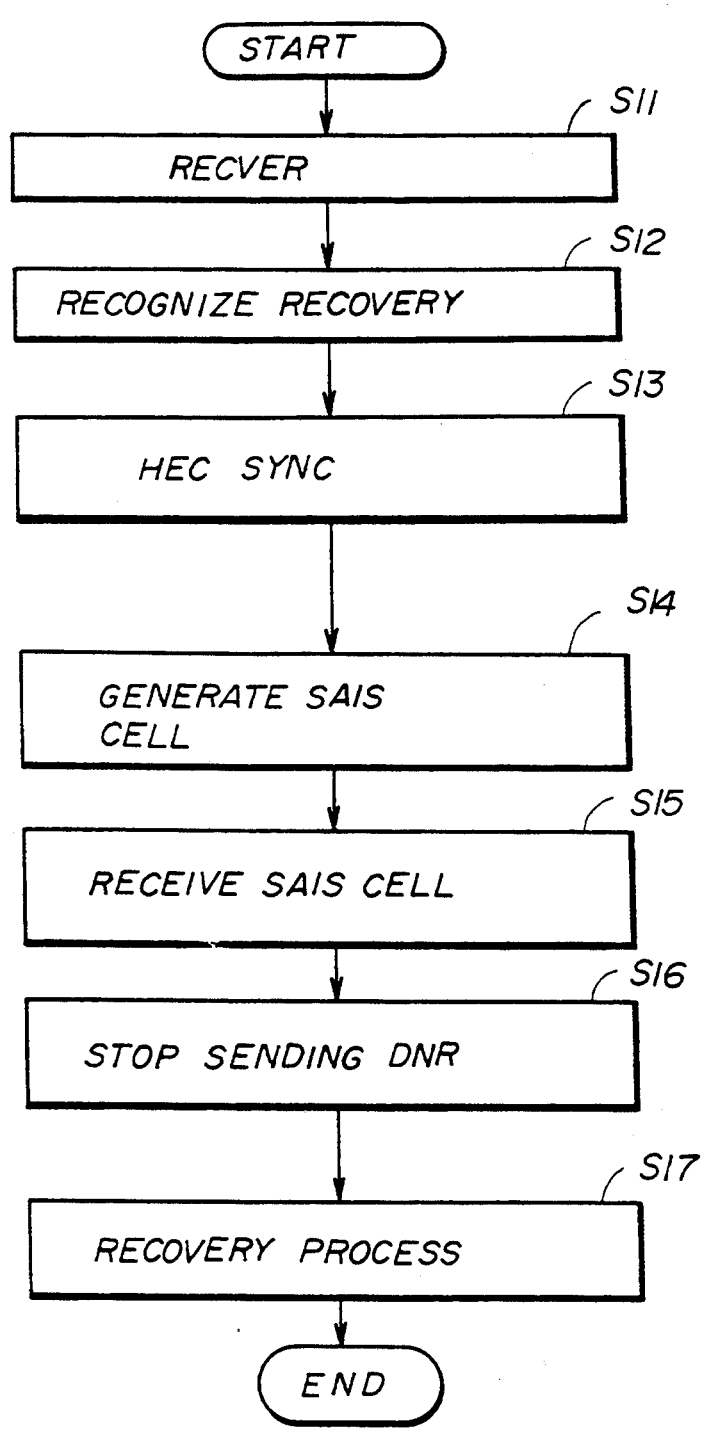
FIG. 14 is a flow chart for explaining the notification of a circuit failure recovery by generating the SAIS cell.

FIG. 14 shows the operation of this embodiment which notifies the circuit failure recovery using the SAIS cell. In FIG. 14, the circuit failure is recovered in a step S11 and the network interface 203 recognizes the circuit failure recovery in a step S12 from the synchronized HEC of the ATM cell which is received from the ATM network 13. The ATM crossconnect part 5 detects the circuit failure recovery by detecting the synchronized state of the HEC in a step S13, and the ATM crossconnect part 5 generates the SAIS cell in a step S14 based on the detection of the synchronized HEC. The adaptation layer processing part 6 receives the SAIS cell from the ATM crossconnect part 5 in a step S15, and the adaptation layer processing part 6 stops sending the DNR to the terminal interface 201 in a step S16. The terminal interface 201 notifies the recovery to the DTE 101 in a step S17.

The steps S13 through S15 form the characterizing part of the recovery notification in this embodiment.

FIG. 15 shows the operation of this embodiment which notifies the circuit failure using the SEND cell. In FIG. 15, those steps which are the same as those corresponding steps in FIG. 13 are designated by the same reference numerals, and a description thereof will be omitted. In FIG. 15, the ATM crossconnect part 5A sends the SEND cell to the other station in a step S21, after the step S2. Then, the ATM crossconnect part 5B on the side of the other station receives the SEND cell in a step S22, and this ATM crossconnect part 5B sends the AIS cell to the adaptation layer processing part 6B on the side of the other station in response to the received SEND cell. The steps S6 and S7 shown in FIG. 13 are carried out after the step S23.

The steps S21 through S23 form the characterizing part of the circuit failure notification in this embodiment.

Further, the present invention is not limited to these embodiments, but various variations and modifications may be made without departing from the scope of the present invention.

What is claimed is:

1. A fault notifying system for notifying a fault in an asynchronous transfer mode network to at least one data terminating equipment, said fault notifying system comprising:

a network interface, coupled to the asynchronous transfer mode network, for outputting an alarm indication signal when a fault is generated in the asynchronous transfer mode network;

an asynchronous transfer mode crossconnect part, coupled to the network interface, for generating an alarm indication signal cell having a predetermined signal format in response to the alarm indication signal;

an adaptation layer processing part, coupled to the asynchronous transfer mode crossconnect part, including means for forming asynchronous transfer mode cells and disassembling asynchronous transfer mode cells and for outputting a data circuit-terminating equipment not ready code in response to the alarm indication signal cell; and a terminal interface, coupled to the data terminating equipment, for notifying the fault in the asynchronous transfer mode network to the data terminating equipment in response to the data circuit-terminating equipment not ready code, said alarm indication signal cell having a cell format identical to an asynchronous transfer mode cell format but having predetermined information in a specific part of the asynchronous transfer mode cell format to distinguish the alarm indication signal cell from the asynchronous transfer mode cell, the specific part of the alarm indication signal cell being an asynchronous transfer mode header of the asynchronous transfer mode cell format, and a fixed value being assigned to parts of the alarm indication signal cell other than the specific part excluding a header error control of the asynchronous transfer mode cell format.

2. The fault notifying system as claimed in claim 1, wherein said terminal interface supplies first and second signals to the data terminating equipment to notify the fault, where the first and second signals are prescribed under the CCITT Recommendation.

3. The fault notifying system as claimed in claim 1, wherein said terminal interface supplies first and second signals to the data terminating equipment to notify the fault, where the first and second signals are prescribed under the CCITT Recommendation.

4. The fault notifying system as claimed in claim 1, wherein the specific part of the alarm indication signal cell is formed by a virtual channel identifier of the asynchronous transfer mode header.

5. A fault notifying system for notifying a fault in an asynchronous transfer mode network to at least one data terminating equipment, said fault notifying system comprising:

a network interface, coupled to the asynchronous transfer mode network, for outputting an alarm indication signal when a fault is generated in the asynchronous transfer mode network;

an asynchronous transfer mode crossconnect part, coupled to the network interface, for generating an alarm indication signal cell having a predetermined signal format in response to the alarm indication signal;

an adaptation layer processing part, coupled to the asynchronous transfer mode crossconnect part, including means for forming asynchronous transfer mode cells and disassembling asynchronous transfer mode cells and for outputting a data circuit-terminating equipment not ready code in response to the alarm indication signal cell; and a terminal interface, coupled to the data terminating equipment, for notifying the fault in the asynchronous transfer mode network to the data terminating equipment in response to the data circuit-terminating equipment not ready code, said alarm indication signal cell having a cell format identical to an asynchronous transfer mode cell format but having predetermined information in a specific part of the asynchronous transfer mode cell format to distinguish the alarm indication signal cell from the asynchronous transfer mode cell;

said asynchronous transfer mode crossconnect part including means for sending a stop alarm indication signal cell to the adaption layer processing part by detecting a synchronization of a header error control of the asynchronous transfer mode cell format, said stop alarm indication signal cell having a cell format identical to the asynchronous transfer mode cell format but having predetermined information in a certain part of the asynchronous transfer mode cell format to distinguish the stop alarm indication signal cell from the asynchronous transfer mode cell and the alarm indication signal cell.

6. The fault notifying system as claimed in claim 5, wherein the certain part of the stop alarm indication signal cell is an asynchronous transfer mode header of the asynchronous transfer mode cell format, and a fixed value is assigned to parts of the stop alarm indication signal cell other than the specific part excluding header error control of the asynchronous transfer mode cell format.

7. The fault notifying system as claimed in claim 6, wherein the certain part of the stop alarm indication signal cell is formed by a virtual channel identifier of the asynchronous transfer mode header.

8. The fault notifying system as claimed in claim 5, wherein said adaptation layer processing part stops supplying the data circuit-terminating equipment not ready code to the data terminating equipment in response to the stop alarm indication signal cell.

9. A fault notifying system for notifying a fault in an asynchronous transfer mode network to at least one data terminating equipment, said fault notifying system comprising:

a network interface, coupled to the asynchronous transfer mode network, for outputting an alarm indication signal when a fault is generated in the asynchronous transfer mode network;

an asynchronous transfer mode crossconnect part, coupled to the network interface, for generating an alarm indication signal cell having a predetermined signal format in response to the alarm indication signal;

an adaptation layer processing part, coupled to the asynchronous transfer mode crossconnect part, including means for forming asynchronous transfer mode cells and disassembling asynchronous transfer mode cells and for outputting a data circuit-terminating equipment not ready code in response to the alarm indication signal cell; and a terminal interface, coupled to the data terminating equipment, for notifying the fault in the asynchronous transfer mode network to the data terminating equipment in response to the data circuit-terminating equipment not ready code, said alarm indication signal cell having a cell format identical to an asynchronous transfer mode cell format but having predetermined information in a specific part of the asynchronous transfer mode cell format to distinguish the alarm indication signal cell from the asynchronous transfer mode cell;

said asynchronous transfer mode crossconnect part including means for sending a SEND cell to the asynchronous transfer mode network via the network interface when the network interface detects a one-way circuit failure in the asynchronous transfer mode network, said SEND cell having a cell format identical to the asynchronous transfer mode cell format but having predetermined information in a predetermined part of the asynchronous transfer mode cell format to distinguish the SEND cell from the asynchronous transfer mode cell and the alarm indication signal cell.

10. The fault notifying system as claimed in claim 9, wherein the predetermined part of the SEND cell is an asynchronous transfer mode header of the asynchronous transfer mode cell format, and a fixed value is assigned to parts of the SEND cell other than the predetermined part excluding the header error control of the asynchronous transfer mode cell format.

11. The fault notifying system as claimed in claim 10, wherein the predetermined part of the SEND cell is formed by at least a virtual path identifier of the asynchronous transfer mode header.

12. The fault notifying system as claimed in claim 10, wherein the predetermined part of the SEND cell is formed by a virtual path identifier and a virtual channel identifier of the asynchronous transfer mode header.

13. The fault notifying system as claimed in claim 9, wherein said asynchronous transfer mode crossconnect part includes means for generating the alarm indication signal cell in response to the SEND cell which is received via the asynchronous transfer mode network and the network interface.

* * * * *